Sept. 23, 1941.   W. BLACK   2,256,878
HYDRAULIC COUPLING
Filed April 10, 1939
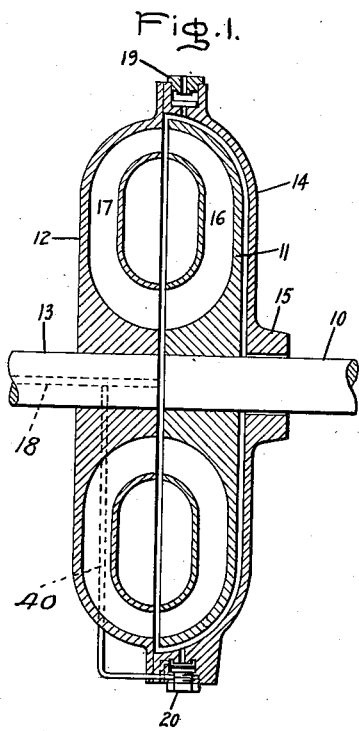
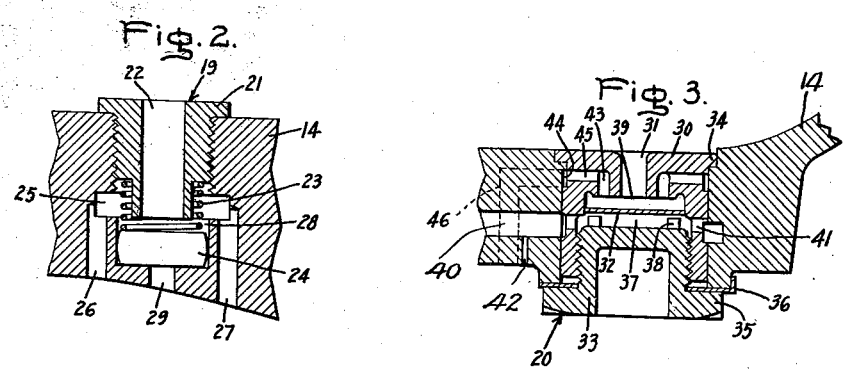
Inventor:
Willy Black,
by Harry E. Dunham
His Attorney.

Patented Sept. 23, 1941

2,256,878

UNITED STATES PATENT OFFICE 2,256,878

HYDRAULIC COUPLING

Willy Black, Berlin-Halensee, Germany, assignor to General Electric Company, a corporation of New York Application April 10, 1939, Serial No. 267,121
In Germany April 19, 1938

1 Claim. (Cl. 60—54)

My invention relates to hydraulic couplings, and more particularly to a Föttinger type of hydraulic coupling.

One object of my invention is to provide an improved means for effecting a filling and drainage of the coupling fluid to obtain a desired coupling action.

For a better understanding of my invention, together with other and further objects thereof, reference is had to the following description taken in connection with the accompanying drawing, and its scope will be pointed out in the appended claim.

In the operation of vehicles, especially heavy vehicles of the rail-operated type, it is desirable to use hydraulic transmissions for torque application and also for direct coupling between the prime mover and the vehicle drive shaft. One type of hydraulic coupling suited for this service is the Föttinger type of hydraulic coupling disclosed in detail in U. S. Patents 1,199,359 and 1,199,361. The coupling effect in this type of hydraulic device is obtained by a fluid circulating in the coupling casing. This fluid is drained from the casing when it is desired to interrupt the coupling action, the drainage being effected through valve controlled openings in the perimeter of the rotating casing which encloses the pump and turbine wheels.

In arrangements heretofore used, all the control valves were simultaneously opened or closed, either automatically or manually. It is found, however, that for drives of this type, two different operating conditions occur. One of these operating conditions occurs when it is desired to change from one hydraulic mechanism to another, and another condition occurs when it is desired to disconnect the prime mover from the drive shaft. During the first of these operating conditions, it is imperative that a steady drive connection be maintained during the period that one of the mechanisms is being filled with operating liquid. Since this requires considerable time, it is necessary to correspondingly proportion the drainage of the fluid from the coupling. In the second operating condition, it is necessary to obtain a complete and quick drainage of the coupling so that the vehicle may be quickly stopped, or so that a mechanical coupling may be connected into the driving system.

In accordance with my invention, a Föttinger type of coupling is provided with valves divided into groups, one of which responds to one of the above-mentioned operating conditions, and the other, or both, respond to the second of the above-mentioned operating conditions.

In the accompanying drawing, Fig. 1 is a cross-sectional elevation through the center of a Föttinger type of hydraulic coupling illustrating in cross-section each of two types of valves; Fig. 2 is an enlarged cross-sectional view of one of the drainage valves; and Fig. 3 is an enlarged cross-sectional view of the second type of drainage valve.

Referring to the drawing in greater detail, Fig. 1 discloses the Föttinger type of coupling including a driving shaft 10 upon which is mounted a pump wheel 11. Contiguous to the pump wheel 11 is a turbine wheel 12 mounted on a driven shaft 13. The pump wheel is enclosed in a casing 14 the edge of which is attached to the turbine wheel and the center of which is supported on the driving shaft 10 in a bearing 15. The pump and turbo wheels are respectively provided with vanes 16 and 17 which together form a circuitous path for liquid passing between the two elements. This type of coupling is described in greater detail in the Föttinger patents 1,199,359 and 1,199,361. The operating liquid for this coupling is injected through a conduit 18 in the driven shaft 13. This conduit opens at the end of the shaft into a space between the turbo and pump wheels of the coupling and the fluid from there passes to the vanes 16 and 17. In order to drain the fluid from this coupling, two types of valves are provided in the periphery of the casing. One type of valve 19, is illustrated in section at the top of Fig. 1, and an enlarged view thereof is shown in Fig. 2. A second type of valve 20 is illustrated at the bottom of Fig. 1 and is illustrated in enlarged view in Fig. 3.

Valve 19 as illustrated in Fig. 2 includes a plug 21 having therein a discharge opening 22, a spring 23 and a valve plate 24. The plug 21 projects through the wall of the casing 14 into a manifold 25 into which discharge openings 26 and 27 conduct fluid from the inside of the casing. The valve member 24 is located in a valve chamber 28 and is normally held within this chamber by the spring 23. An opening 29 between the bottom of the valve chamber 28 and the inside of the casing forms a discharge opening for any fluid that may be in the valve chamber. When the valve plate 24 is in the position shown in Fig. 2, a discharge path for fluid is established through the openings 26 and 27, to the manifold 25 and the hole 22 through the plug 21. When the casing revolves at a speed equivalent to a 50 kilometer per hour speed of the vehicle, the valve member 24 is pressed against the lower end of the plug 21 to prevent the escape of fluid through the opening 22. The tension of the spring 23 is adjusted so that the valve member will close at the 50 kilometer per hour speed, and will open at a speed approximately equal to 40 kilometers per hour.

Fig. 3 discloses the valve 20 which includes a valve bushing 30 which is partly closed at one end, having only a discharge opening 31 therein, a valve diaphragm 32 and a plug 33. The plug 33 projects into the valve bushing 30, and when screwed into this bushing tightly, it locks the valve assembly into the wall of the casing 14, the bushing being provided with a flange 34 at its closed end, and the plug being provided with a flange 35 which is locked against the casing surface and against a washer 36. When the bushing and plug are so assembled, the diaphragm 32 is within a chamber 37 formed between the closed end of the bushing and the end of the plug 33. The diaphragm normally rests on prongs 38 above the end surface of the plug 33 and is capable of moving away from and against a seat 39 on the surface provided at the closed end of the bushing. The diaphragm is very thin, and is, therefore, substantially free of centrifugal force. It is normally pressed against the inner end of the opening 31 by fluid pressure exerted from the fluid intake conduit 18 through a connecting conduit 40. This intake conduit is connected to the diaphragm chamber 37 through openings 41 in the wall of the bushing 30, and conducts fluid to the outer surface of the diaphragm, this pressure being sufficient to move the diaphragm and close the end of the opening 31. When the supply of fluid through the intake conduit 18 is shut off, the pressure in the conduit 40 is relieved through a pressure relief opening 42 and the pressure of the fluid inside of the coupling moves the diaphragm away from the inner end of the opening 31. Fluid flowing through this opening then enters the diaphragm chamber 37 on the inner side of the diaphragm and from there flows into a manifold 43, which surrounds the opening 31, through openings 45 to a second manifold 44 and through conduit 46 to the outside of the casing.

In operation, the above-described coupling receives its operating fluid through the intake conduit 18 and thereby effects a coupling between the prime mover connected to the shaft 10 and the vehicle drive shaft connected to the shaft 13.

When the vehicle reaches a hill and it is desired to amplify the torque output of the prime mover through a Föttinger type of torque converter and to maintain a constant vehicle speed, the fluid supply to the coupling is shut off and the fluid within the coupling begins to drain through the opening 46. The rate of drainage is calculated to be substantially equal to the rate of filling of the torque converter, so that as the coupling action decreases, the action of the torque converter is increased, and therefore, if the prime mover speed is increased in proportion to the increase in the transmission ratio of the torque converter over the coupling, a continuous and amplified torque is exerted upon the drive shaft of the vehicle. The speed of the vehicle thereby remains unchanged and the centrifugal valves do not operate. If it is desired to stop the vehicle, however, the fluid supply is shut off altogether, thereby reducing the speed of rotation of the turbine wheel and casing. When the vehicle speed is reduced to approximately 40 kilometers per hour, the centrifugally operated valve also opens. The fluid is then drained out of the coupling through the two openings, or the two groups of openings, and consequently, its operation as a coupling ceases within a much shorter period than would be the case if the fluid operated openings alone were opened.

What I claim as new and desire to secure by Letters Patent of the United States is:

In a hydraulic coupling of the Föttinger type the combination of a turbine wheel, a pump wheel, a casing surrounding said wheels and rotatable with said turbine wheel, a working fluid in said casing, a conduit for supplying said fluid, discharge valves in said casing to discharge said fluid and thereby control the operation of said coupling, one of said valves being responsive to the fluid pressure in said fluid supply conduit and operable to discharge fluid from said casing when said conduit fluid pressure falls below a predetermined value and a second valve responsive to centrifugal force an operable to discharge fluid from said casing when the speed of rotation of said turbo wheel falls below a predetermined value whereby a predetermined low rate of discharge from said casing is obtained by a fluid pressure control and a predetermined greater rate of discharge is obtained when the fluid pressure and the speed of operation are simultaneously reduced.

WILLY BLACK.